June 1, 1926.                          1,587,080
A. MARCELLI
VALVE
Filed June 22, 1920
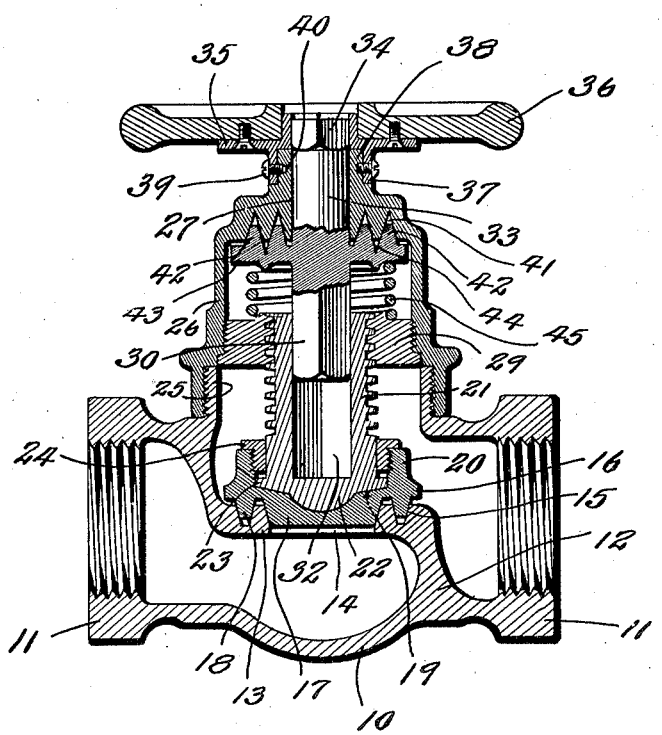
Inventor
Attilio Marcelli
By F. L. Cornwall Atty.

Patented June 1, 1926.

1,587,080

UNITED STATES PATENT OFFICE.

ATTILIO MARCELLI, OF OVERLAND, MISSOURI.

VALVE.

Application filed June 22, 1920. Serial No. 390,708.

My invention relates generally to valves and more particularly to valves that are utilized for the control of relatively high fluid pressures, the principal object of my invention being to provide a relatively simple and efficient valve which is designed so that it does not require any extraneous packing members such as disks or washers, and which latter are usually composed of rubber, leather or analogous material and which tends to rapidly deteriorate, particularly when subjected to relatively high temperatures or to the action of certain gases or chemicals.

Further objects of my invention are, to provide a valve wherein the parts are constructed so that they may be readily assembled or taken apart; to construct the operating parts of the valve so that they will not tend to stick or bind, and thereby prevent the free operation of the valve in its opening or closing movements; and, further, to provide a valve wherein absolutely fluid pressure tight joints are formed between all of the cooperating parts, thereby rendering the valve particularly adaptable for use in structures or apparatus utilized for the handling and control of high fluid pressures.

With the foregoing and other objects in view, my invention consists in certain novel features of construction and arrangement of parts, hereinafter more fully described and claimed, and illustrated in the accompanying drawings, in which—

The figure is a vertical section taken through the center of a valve constructed in accordance with my invention.

Referring by numerals to the accompanying drawings, and particularly to the construction illustrated in Figure 1, 10 designates the main body of the valve, the same being provided with a pair of oppositely disposed tubular extensions 11, and the latter being internally threaded in order to receive the threaded ends of pipes which serve as fluid conductors. Formed integral with this body and arranged in the chamber therein is a partition 12 having a horizontally disposed portion 13 and formed through the latter is a centrally arranged opening 14.

Formed in the top of the horizontally disposed portion 13 and around the opening 14 therein is a groove, 15, the walls of which are preferably inclined and this groove and the top of the horizontally disposed portion 13 constitute a seat for a valve 16. This valve is in the form of a disk having on its underside a depending portion 17 that is adapted to extend downward into the opening 14 in partition 13 and disposed around this depending portion 17 is a depending annular flange or rib 18 having inclined side faces and which flange is adapted to enter the annular groove 15. The side faces of this flange 18 and the side faces of groove 15 may be ground or lapped in order to provide a fluid pressure tight joint between the side faces when the valve is tightly closed upon its seat and the sizes of the rib and groove are such that the rib does not extend all the way to the bottom of the groove and the undersurfaces of the disk immediately to the sides of the rib are spaced apart from the seats immediately to the sides of the groove 15, thereby affording sufficient space for the valve to gradually move downward as a result of wear between the ground or lapped faces of said rib and groove.

Formed in the top of the body of valve 16 is a substantially concave recess 19 and disposed around this recess is an upstanding annular flange 20 that is internally threaded. The lower portion of the valve stem comprises a substantially cylindrical member 21, the lower end of which is provided with a plate 22, the underface of which is convex and shaped so that it will fit snugly against the concave surface of the recess 19. The edge of plate 22 terminates in a small annular flange 23 that is positioned within the annular flange 20 and screw-seated in this last mentioned flange is a ring nut 24, the same encircling the lower portion of stem member 21 and being positioned above and spaced a slight distance apart from the top of flange 23. The top of the body 10 of the valve terminates in an annular flange 25 that is externally threaded and screw-seated thereupon is the internally threaded lower end of a substantially cylindrical bonnet 26, the upper end of the latter being provided with a vertically disposed bearing 27 for the upper valve stem member.

The greater portion of the body of the lower part 21 of the valve stem is externally threaded as designated by 28 in order that it may be screwed vertically through a ring nut 29 and which latter is screw-seated in the intermediate portion of the bonnet 26. The upper portion of the valve stem comprises a vertically disposed rod, the lower portion 30 of which is square or non-circular in cross section, and this portion being arranged for vertical sliding movement in a corresponding opening 32 that is formed axially within the lower part 21 of the valve stem.

The upper portion 33 of the upper part of the stem is round in cross section and arranged for rotation in the bearing 27. The extreme upper end of the upper portion of the valve stem and which is made square or non-circular in cross section as designated by 34 is seated in a corresponding opening that is formed in the central portion of a socket plate 35 and the latter being fixed in any suitable manner to the underside of a hand wheel or disk 36. Depending from this socket plate 35 is an annular flange 37, the same enclosing and being arranged for rotation upon the reduced upper end 38 of the bonnet 26.

To retain the hand wheel upon the bonnet, screws such as 39 pass through the flange 37 and enter an annular groove 40 that is formed in the outer face of the reduced portion 38 of the bonnet. Formed in the underside of the cap or top portion of the bonnet 26 is a plurality of concentric grooves 41, the same being substantially of inverted V-shape in cross section and occupying the lower portions of these grooves are the upper portions of annular ribs or flanges 42 that are formed integral with and project upwardly from a plate or disk 43, and the latter being formed integral with or fixed to the central portion of the upper part of the valve stem. The groove 44 between these ribs or flanges 42 is substantially V-shape in cross section and its upper portion receives the lower portion of the corresponding rib that is formed between the inverted V-shaped grooves 41. The side faces of the grooves 41 and ribs 42 are ground or finished so as to provide a lap fit, and as these surfaces are always in contact with each other, an effective fluid tight joint is formed between the disk 43 and upper portion of the bonnet.

In order to further increase the effectiveness of this joint, the upper portions of grooves 41 and the lower portion of groove 44 may be filled with grease or heavy oil and the latter in addition to lubricating the adjacent faces of the interengaging parts effectually prevents the passage of compressed air or gases between the disk 43 and bonnet.

The disk 43 is normally forced upward into engagement with the grooved upper portion of the bonnet by an expansive coil spring 45 and which latter is disposed between said disk 43 and the nut 29.

To open my improved valve, hand wheel 36 is manipulated to rotate the upper part of the valve stem and as the non-circular lower portion 30 of said part occupies the recess 32 in the cylindrical lower portion 21 of said stem, the latter will be rotated and at the same time it will move vertically upward by engagement of the external thread on said lower portion 21 in the ring nut 29. This movement will elevate valve 16 from its seat, thereby permitting the passage of fluid pressure through the valve body.

By reversely rotating the valve stem, the lower part 21 carrying valve 17 will be moved downward simultaneously with its rotation and when said disk is firmly positioned upon the seat on top of the portion 13, the passage of fluid pressure through the valve body will be cut off.

As valve 16 is free to move vertically for a short distance upon the disk 22 carried by the lower end of the lower valve stem member 21, said valve will automatically adjust itself to its seat when tightly positioned thereupon.

In view of the fact that the underside of socket plate 35 bears directly on top of the reduced upper end 38 of the bonnet, it will be impossible for the upper part of the valve stem and disk 43 to be moved downward away from the upper or cap portion of the bonnet as a result of downward pressure upon the hand wheel 36 while the valve is being opened or closed.

A valve of my improved construction is comparatively simple, can be easily and cheaply produced, is capable of being readily assembled or taken apart, is devoid of packing rings and disks or like packing elements which in the presence of high temperatures and certain chemicals and gases deteriorate rapidly, and said valve by virtue of its non-leaking qualities is particularly adapted for use in lines utilized for conducting relatively high fluid pressures.

It will be readily understood that minor changes in the size, form and construction of the various parts of my improved valve can be made and substituted for those herein shown and described, without departing from the spirit of my invention, the scope of which is set forth in the appended claims.

I claim as my invention:—

1. In a valve, a housing provided with a valve seat, said valve seat having an upwardly projecting annular rib, a bonnet connected to the housing and having a circular groove in its underface, a handle rotatably mounted on the bonnet, a handle stem in non-rotative engagement with the handle, a disk formed integral with the handle stem and provided with an upwardly presented concentric rib which is arranged to be seated in the circular groove of the bonnet, a member threaded into the intermediate portion of the bonnet, a spring interposed between the disk and said member for holding the concentric rib of the disk seated in the circular groove formed in the under face of the bonnet, a valve stem screw seated in the said member and in non-rotative engagement with said handle stem, and a valve rotatably carried by the lower end of said valve stem and provided in its underside with an annular groove which is adapted to receive, when the valve is seated, the annular rib projecting upwardly from said valve seat.

2. In a valve, a housing, a valve seat in said housing, said valve seat being provided with a circular groove, a bonnet connected to said housing and provided on its under face with circular grooves, a handle rotatably mounted on said bonnet, a handle stem journaled in said bonnet and having its upper end in non-rotative engagement with said handle, a disk carried by said handle stem and provided with upwardly presented circular ribs, a plug seated in the intermediate portion of said bonnet, a spring resting on said plug and bearing against said disk whereby the ribs formed thereon are held in engagement with the grooves in said bonnet, a valve stem screw-seated in said plug and in non-rotative engagement with said handle stem, said valve stem being provided at its lower end with an outwardly projecting annular flange, a valve arranged to be seated in said valve seat and provided with a depending annular rib adapted to be seated in the circular groove of said valve seat, said valve being provided with an upwardly extending cylindrical portion and a ring in threaded engagement with said cylindrical portion and resting on said annular flange thereby rotatably supporting said valve on said valve stem.

3. In a valve, a housing provided with a valve seat, a bonnet mounted on said housing, a handle stem journaled in said bonnet, a tubular extension extending upwardly from said bonnet, a sleeve rotatably mounted on the upper end of said tubular extension and in non-rotative engagement with said handle stem, a handle fixed to said sleeve, a circular flange arranged on said handle stem and provided with an upwardly presented annular rib, said bonnet being provided in its face with an annular groove adapted to receive said annular rib, means for yieldingly maintaining said flange and said bonnet in operative interengagement, a valve stem having non-rotative engagement with the lower end of said handle stem and screw-seated in said bonnet whereby the rotation of said valve stem imparts thereto reciprocatory movement, and a valve rotatably carried by the lower end of said valve stem and adapted to be seated in said valve seat.

In testimony whereof I hereunto affix my signature this 19th day of June, 1920.

ATTILIO MARCELLI.